Oct. 22, 1929.                M. BOCK                  1,732,396
                         TELEMETRIC GAS ANALYZER
                           Filed Nov. 19, 1926
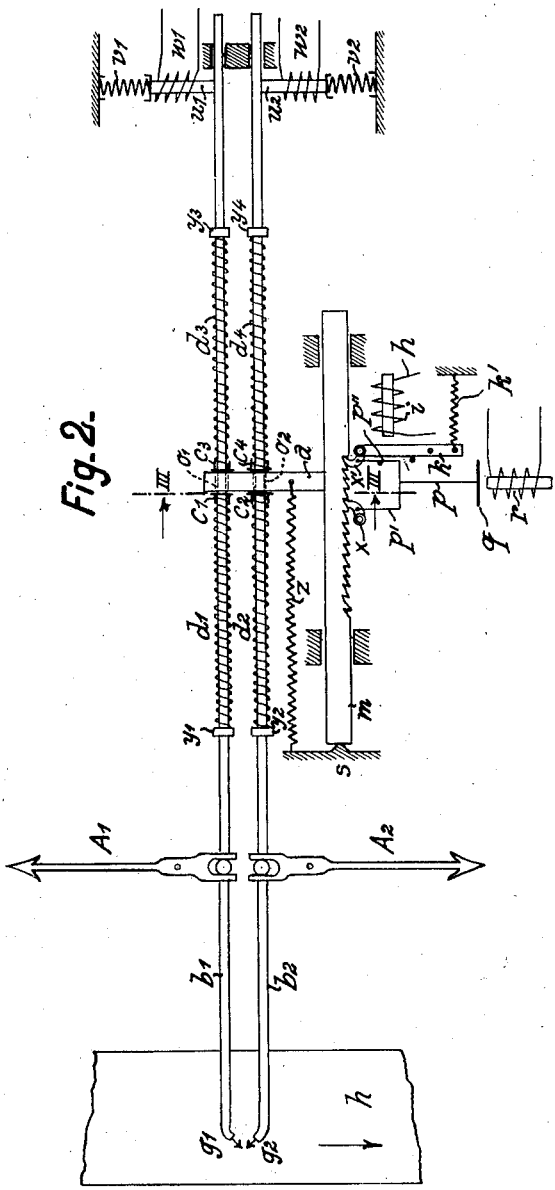
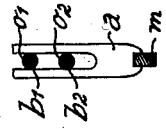
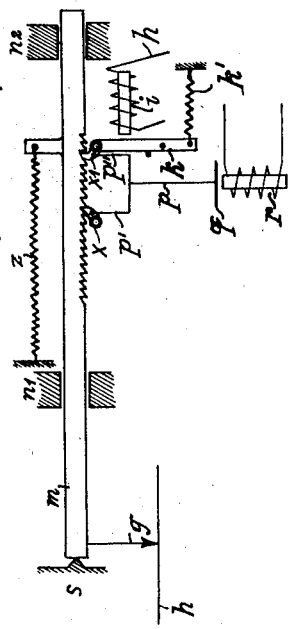
M. Bock
    Inventor
By: Marks & Clark
           Attys.

Patented Oct. 22, 1929

1,732,396

UNITED STATES PATENT OFFICE

MAX BOCK, OF HAMBURG, GERMANY

TELEMETRIC GAS ANALYZER

Application filed November 19, 1926, Serial No. 149,496, and in Germany November 23, 1925.

My invention relates to remote recording devices, and has for its object to provide improved means for operating the indicating and recording mechanisms of such devices.

To this end, instead of circular racks, that is, ratchet wheels, I provide straight racks intermediate the instrument to be recorded and the mechanisms.

The indicating or recording mechanism is actuated periodically by impulses which are controlled by the devices to be recorded so that their number is a function of the motion of the device to be recorded. By the impulses an electromagnet is energized the armature of which operates a ratchet wheel and an indicator disc operatively connected with the wheel.

It would be practicable to provide recording means on the indicator disc but such an arrangement would be too awkward in view of the large size of the indicator disc and, moreover, the accuracy of the records would be interfered with by the inertia of the disc and its ratchet wheel.

All these drawbacks are eliminated in my novel analyzer which as mentioned, is actuated similarly to the analyzer referred to but in which the impulses which the devices to be recorded controls, do not effect the rotation of a ratchet wheel but the displacement of a straight rack. From this rack, the hands or styli of the indicator or recorder, as the case may be, are operated directly or thru the medium of a gear by which the motion of the analyzer from zero to maximum is changed into a motion intermediate the maxima.

Such a gear may comprise one or more parallel recording bars which are operatively connected with the rack by springs and will mark continuous curves on a strip of paper. Each bar is provided with a brake which is automatically released as often as the rack returns to its initial position, allowing the spring of the bar to return it to its own initial position.

In the drawing, I have illustrated two recording mechanisms,

Fig. 1 showing diagrammatically a mechanism with a single recording bar, and

Fig. 2 showing, also diagrammatically, a mechanism with two recording bars,

Fig. 3 being a section on the line III—III in Fig. 2.

Referring now to Fig. 1, $i$ is an electromagnet which for example may be energized by impulses from a gas bell or any moved object in the wire $h$. $k$ is the armature of the electromagnet, $k'$ is its pull-back spring, $x'$ is a pawl on the armature, $m$ is a rack adapted to be displaced by the pawl $x'$, $n'$ and $n^2$ are brackets in which the rack is guided, $z$ is a tension spring for the rack $m$, $s$ is a stationary check which determines the initial position of the rack, $g$ is a stylus at the outer end of the rack, and $h$ is a strip of paper on which the record of the recorder is marked by the stylus.

$r$ is a releasing electromagnet, $q$ is its armature, $p$ is a rod secured to the armature, $x$ is a pawl which holds the rack $m$ in position, and $p'$ and $p''$ are links connecting the rod $p$ with the pawls $x$ and $x'$, respectively.

The rack is displaced for the pitch of one tooth for each impulse by the armature $k$ and its pawl $x'$ against the action of the spring $z$, and the motion of the rack is recorded on the strip $h$. When the releasing magnet $r$ is energized, both pawls $x$ and $x'$ are withdrawn from the teeth of the rack $m$ and the spring $z$ returns the rack to its initial position.

If desired the motion of the rack may be transferred to the stylus by a suitable system of links and levers on an enlarged scale.

Referring now to Figs. 2 and 3, these show a recorder in which two recording bars are provided, one, say, for example carbon monoxide, and the other for carbon dioxide.

The rack $m$, which may be called a primary moving member, and the means for displacing, arresting and releasing it are constructed exactly as described with reference to Fig. 1 and are therefore marked with the same reference letters, but the rack is not directly connected with the stylus. $a$ is a fork secured to the rack $m$, $b'$ and $b^2$ are recording bars extending through the eye of the fork, $o'$ and $o^2$ are tubes seated on the bars $b'$, $b^2$ within the fork $a$, $c'$ and $c^3$, $c^2$ and $c^4$ are small flanged tubes which are free to slide on the bars, and $d'$, $d^3$, $d^2$ and $d^4$ are springs carried on the bars intermediate the flanged tubes and checks $y'$, $y^3$, and $y^2$, $y^4$ on the bars. $u'$ is a brake block for the bar $b'$, and $u^2$ is a brake block for the bar $b^2$, springs $v'$, $v^2$ tending to hold the brake blocks engaged with their respective bars, and $w'$, $w^2$ are electromagnets which, when energized, withdraw the brake blocks so as to release the bars. $g'$, $g^2$ are styli at the ends of the bars, and $h$ is a strip on which the records are marked.

When the electromagnet $i$ is energized the rack $m$ is displaced as described with reference to Fig. 1, and the bars $b'$, $b^2$ are placed under the tension of the springs $d^3$, $d^4$ but not moved as they are retained by their brake blocks. Suppose that the magnet $w'$ is energized the brake block $u'$ will release the bar $b'$ and the spring $d^3$ will move the bar to the right in which position it is arrested when the magnet $w'$ is de-energized. The release magnet $r$ is now energized and the rack $m$ is allowed to return to its initial position while the bar $b'$ remains in the position it had assumed. For the next displacement of the rack $m$, the brake block $u^2$ will be released allowing the bar $b^2$ to move to the right in which position it is arrested by the brake block $u^2$ which had previously released the bar under the action of its magnet $w^2$.

When a test has been completed the two bars will remain in the positions which have been imparted to them and, at the next test, the bars will move from these positions only thru a distance corresponding to the values ascertained during this test, and so on, so that continuous curves will be marked on the strip $h$ by the styli $g'$, $g^2$.

Obviously, if it is desired to test for example only the carbon monoxide or the carbon dioxide content of the gases, or any other single variable, only one bar will be required.

If desired, hands $A'$ and $A^2$ may be provided in connection with the bars $b'$, $b^2$ by which the test is indicated on scales, not shown.

I claim:

1. In a recording device, a primary moving member, elastic means tending to hold said member in normal position, electromagnetically operated means for causing a step by step movement of said member against the action of said elastic means, means for retaining said member in any position to which it is moved, a plurality of recording members, elastic connections between said primary moving member and said recording members, braking means associated with each recording member, means for independently releasing each braking means to permit the released recording member to assume a position corresponding with that of the primary moving member, and means for releasing said retaining means and said electromagnetically operated means for permitting said primary moving member to return to normal position.

2. In a recording device, a primary moving member, means for adjusting said member from a normal position to a new position corresponding to an amount to be recorded, a plurality of recording members, elastic connections between said primary moving member and said recording members, braking means associated with each recording member, means for independently releasing each braking means to permit the released recording member to assume a position corresponding with that of the primary moving member, and means for returning said primary moving member to normal position.

In testimony whereof, I have signed my name to this specification.

MAX BOCK.